US009611050B2

(12) United States Patent
Tretow et al.

(10) Patent No.: US 9,611,050 B2
(45) Date of Patent: Apr. 4, 2017

(54) AUXILIARY POWER UNIT INLET APPARATUS AND METHODS

(71) Applicant: The Boeing Company, Chicago, IL (US)

(72) Inventors: Paul R. Tretow, Mukilteo, WA (US); David S. Chambers, Bellevue, WA (US); Robert H. Willie, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 725 days.

(21) Appl. No.: 13/952,219

(22) Filed: Jul. 26, 2013

(65) Prior Publication Data

US 2015/0031276 A1    Jan. 29, 2015

(51) Int. Cl.
*B64D 33/02* (2006.01)
*F02C 7/04* (2006.01)
*B64D 41/00* (2006.01)

(52) U.S. Cl.
CPC ............. *B64D 33/02* (2013.01); *B64D 41/00* (2013.01); *F02C 7/04* (2013.01); *B64D 2033/0213* (2013.01); *F05D 2220/50* (2013.01)

(58) Field of Classification Search
CPC    B64D 33/02; B64D 41/00; B64D 2033/0213; F02C 7/04; F05D 2220/50
USPC .................................. 454/76, 70, 71, 72, 75
See application file for complete search history.

(56) References Cited

U.S. PATENT DOCUMENTS

| 4,418,879 | A | 12/1983 | Vanderleest |
| 5,162,620 | A | 11/1992 | Ross et al. |
| 5,655,359 | A | 8/1997 | Campbell et al. |
| 6,050,527 | A | 4/2000 | Hebert et al. |
| 6,092,360 | A | 7/2000 | Hoag et al. |
| 6,264,137 | B1 * | 7/2001 | Sheoran ................. B64D 33/02 244/53 B |
| 6,272,838 | B1 | 8/2001 | Harvell et al. |
| 6,293,494 | B1 | 9/2001 | Scherer et al. |
| 6,651,929 | B2 | 11/2003 | Dionne |
| 7,222,819 | B1 | 5/2007 | Kelnhofer |
| 7,344,107 | B2 | 3/2008 | Campbell et al. |

(Continued)

FOREIGN PATENT DOCUMENTS

CN    102777261    11/2012

OTHER PUBLICATIONS

English Machine Translation of CN102777261A, Nov. 14, 2012.*

(Continued)

*Primary Examiner* — Gregory Huson
*Assistant Examiner* — Dana Tighe
(74) *Attorney, Agent, or Firm* — Hanley, Flight & Zimmerman, LLC

(57) ABSTRACT

Auxiliary power unit inlet apparatus and methods are disclosed. An example apparatus includes an air inlet for an aircraft including a first air flow path and a second air flow path. The first air flow path is immediately adjacent the second air flow path. The first air flow path is at least partially separated from the second air flow path by a first panel. The example apparatus includes a door hingably coupled adjacent the air inlet. The door includes a second panel extending from an interior surface of the door to substantially prevent air from flowing across the interior surface between the first air flow path and the second air flow path.

22 Claims, 6 Drawing Sheets

(56) References Cited

U.S. PATENT DOCUMENTS

| | | |
|---|---|---|
| 8,061,650 B2 | 11/2011 | Nguyen et al. |
| 8,141,818 B2 | 3/2012 | Bouldin et al. |
| 2006/0102781 A1 | 5/2006 | Hein et al. |
| 2007/0063098 A1 | 3/2007 | Dionne |

OTHER PUBLICATIONS

European Patent Office, "Extended Search Report", issued in connection with European Patent Application No. 14169918.1, issued on Nov. 3, 2014, 7 pages.

* cited by examiner

AUXILIARY POWER UNIT INLET APPARATUS AND METHODS

FIELD OF THE DISCLOSURE

This disclosure relates generally to auxiliary power unit inlets and, more particularly, to auxiliary power unit inlet apparatus and methods.

BACKGROUND

Some aircraft include auxiliary power units (APUs) that provide electrical and/or pneumatic power to the aircraft. In some examples, these APUs can be used to start the primary engines.

BRIEF DESCRIPTION OF THE DRAWINGS

Wherever possible, the same reference numbers will be used throughout the drawing(s) and accompanying written description to refer to the same or like parts.

DETAILED DESCRIPTION

The examples disclosed herein relate to air inlet apparatus for vehicles (e.g., airplanes, aircraft, etc.) having two or more air flow paths that prevent and/or minimize adverse effects due to differences in inlet airflows. In some examples, the air inlet apparatus is an auxiliary power unit (APU) inlet apparatus having first and second air flow paths separated by a divider or panel. The first air flow path may be associated with an APU inlet and the second air flow path may be associated with an eductor and/or an APU cooling duct.

To substantially direct fluid flow into the respective air flow paths, the example air inlet apparatus includes an example door or flap that is movably and/or hingably coupled adjacent an inlet aperture of the air inlet apparatus. In some examples, the door includes first and second side flaps and a second divider and/or isolation panel extending from an interior surface of the door and positioned between the first and second side flaps.

When the aircraft is on the ground, the first and second side flaps substantially prevent corner vortices from forming between lateral edges of the door and an outer skin of the airplane. If such corner vortices form and/or enter the air flow paths, the efficiency of an auxiliary power unit (APU) to which the air inlet apparatus is coupled may be decreased. When the aircraft is airborne, the first and second side flaps substantially prevent air from spilling around the inlet aperture. Thus, the first and second side flaps enable more air to flow into the air flow paths.

In some examples, the isolation panel, which is positioned between the side flaps, substantially prevents fluid from flowing across the interior surface of the door between the first air flow path and the second air flow path. Thus, one of the air flow paths can operate at a mass flow rate significantly higher than the other without negatively effecting the operation of the lower mass flow rate flow path. Enabling the air flow paths to operate at different mass flow rates without substantial interference enables a total pressure recovery to be increased and/or a flow distortion to be decreased in either and/or both of the lower mass flow rate flow path and/or the higher mass flow rate flow path.

To enable the door to be stowed and/or retracted and/or to prevent fluid flow into the first and/or second air flow paths, the first and second side flaps and/or the isolation panel may be received within the inlet aperture. In some examples, when the door is in the closed position, the isolation panel is positioned adjacent the first divider and/or the door substantially prevents air from entering the first and/or second flow paths.

Figure 1:
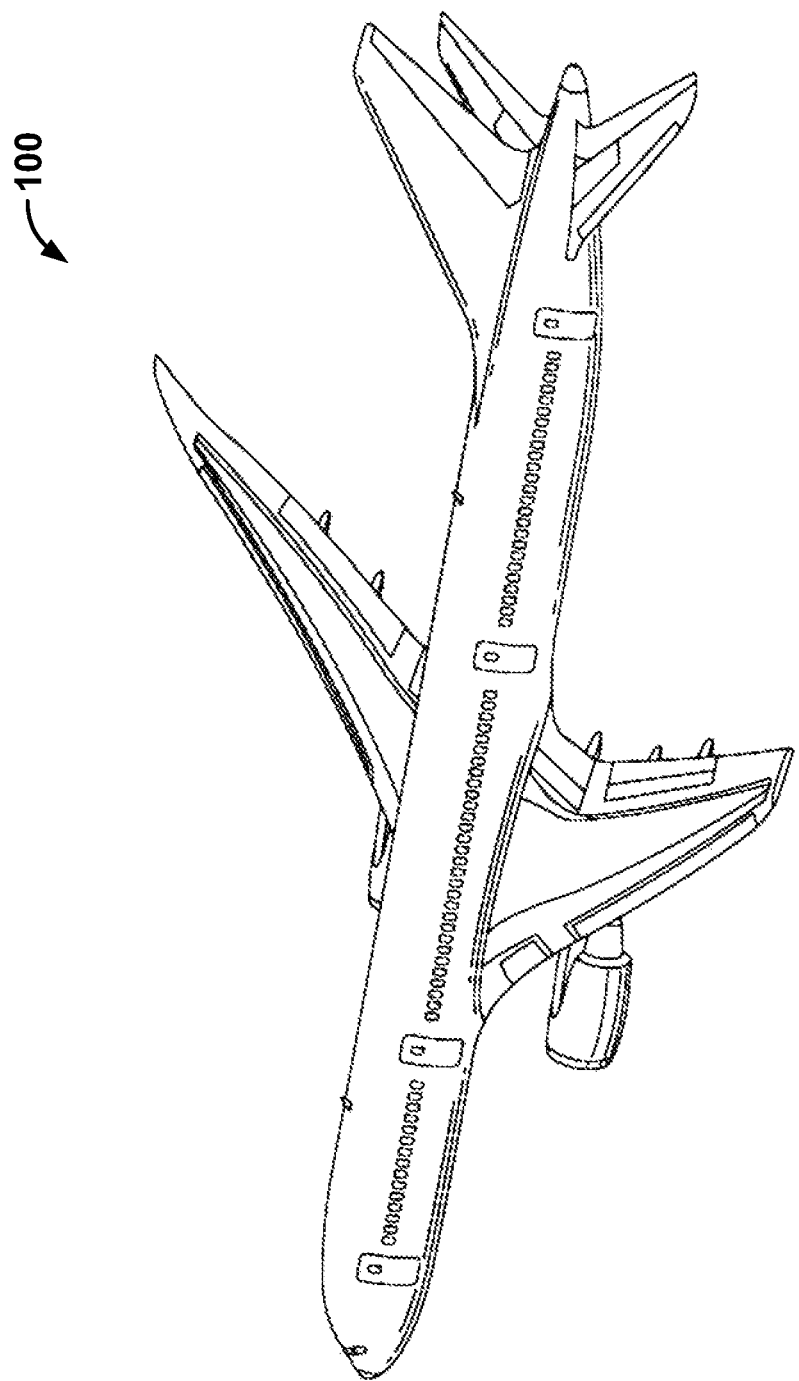
FIG. 1 depicts an example aircraft in which an example auxiliary power unit inlet apparatus in accordance with the teachings of this disclosure can be implemented.
Figure 2:
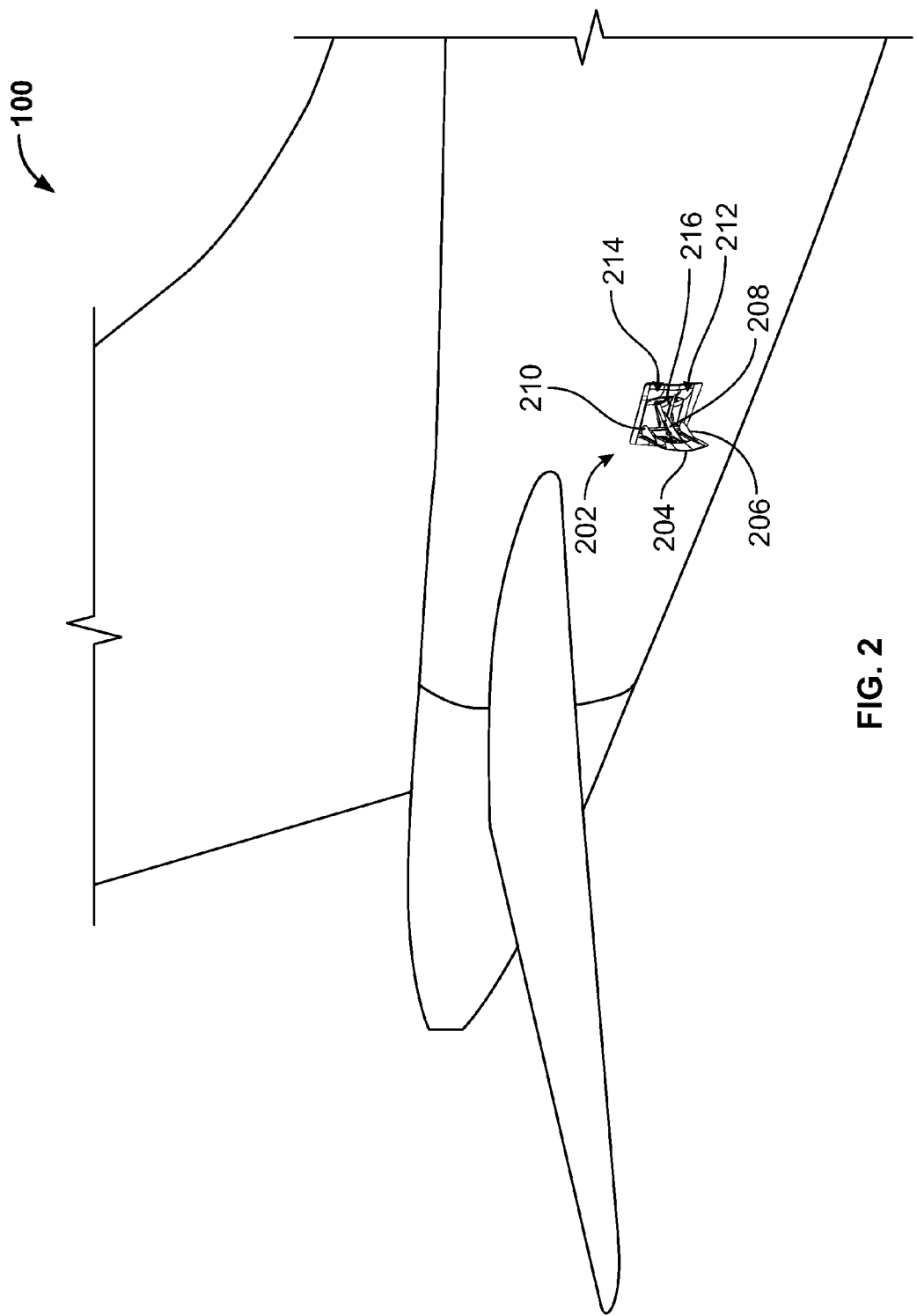
FIG. 2 depicts a portion of the aircraft of FIG. 1 having the example auxiliary unit inlet apparatus.

FIG. 1 illustrates an example aircraft 100 having an example air inlet apparatus 202 (FIG. 2) in accordance with the teachings of this disclosure. FIG. 2 illustrates a more detailed view of the example aircraft 100 and the apparatus 202. In some examples, the apparatus 202 includes a door 204 hingably coupled adjacent an inlet aperture 205 of the apparatus 202. In this example, the door 204 includes first, second and third inwardly extending fins, dividers, panels and/or flaps 206, 208, 210 that, for example, assist in directing fluid flow within the inlet aperture 205 and, specifically, first and second air flow paths 212, 214. While the door 204 is being shown as having the first and third dividers 206, 210, in other examples, the door 204 may not include the first and third dividers 206, 210. While the apparatus 202 is being shown as having two air flow paths, in other examples, the apparatus 202 may have any number of flow paths (e.g., 3, 4, etc.). In some examples, the first and second air flow paths 212, 214 are separated by an outwardly extending fin, divider and/or flap 216 at least partially positioned within the inlet aperture 205. In some examples, the first and second air flow paths 212, 214 are associated with an APU inlet and an eductor and/or APU cooling duct, respectively.

Figure 3:
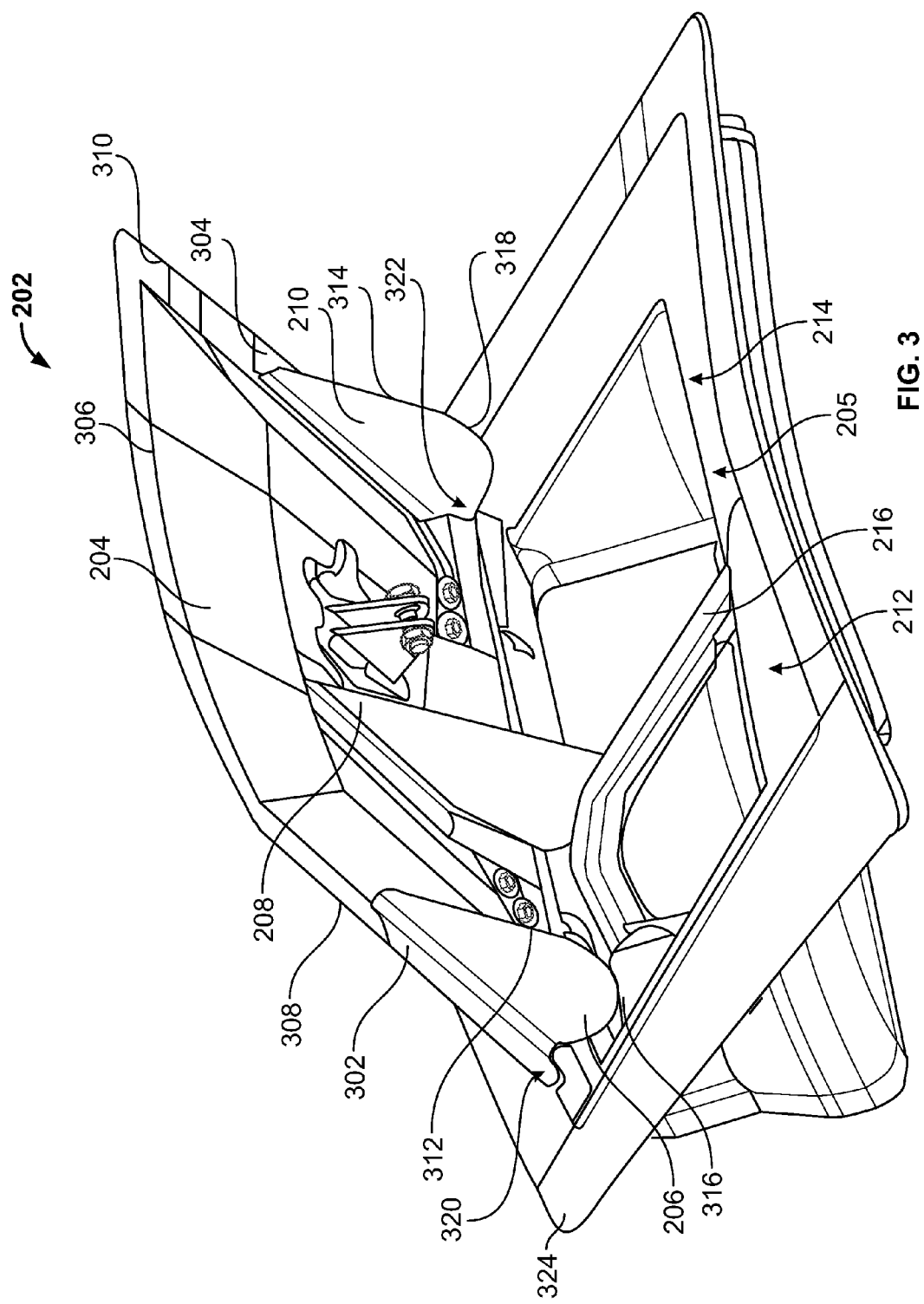
FIGS. 3 and 4 depict different isometric views of the example auxiliary power unit inlet apparatus as shown in FIG. 2 in accordance with the teachings of this disclosure.
Figure 4:
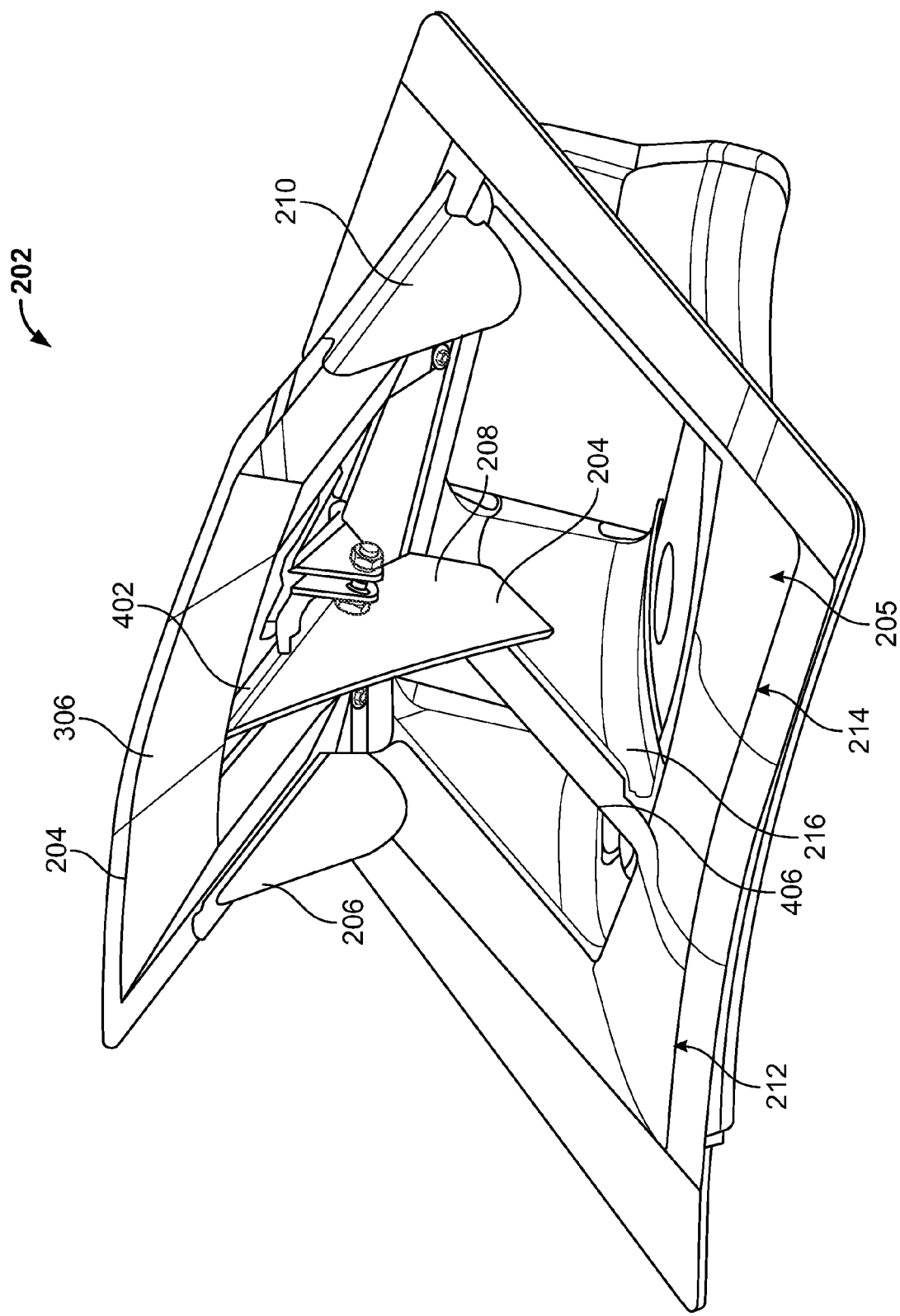

In some examples and as shown in FIGS. 3 and 4, the first and third dividers 206, 210 have flanges 302, 304 that are coupled to an interior surface 306 of the door 204. In some examples, the first and third dividers 206, 210 are positioned adjacent opposing lateral edges 308, 310 of the door 204 and have angled surfaces 312, 314 and/or rounded surfaces 316, 318 that at least partially cover corners 320, 322 formed between the lateral edges 308, 310 and a surface (e.g., an outer airplane skin) 324 surrounding the inlet aperture 205 when the door 204 is in an open position (e.g., shown in FIG. 3). While FIG. 3 depicts the door 204 in a particular open position, the door 204 may be positioned at various open positions and/or angles relative to the surface 324. In some examples, covering the corners 320, 320 substantially prevents corner vortices from entering the first and/or second air flow paths 212, 214 and/or from forming at the corners 320, 322 when the aircraft 100 is on the ground. Additionally or alternatively, in some examples, the first and third dividers 206, 210 substantially prevent air from spilling around the inlet aperture 205 when the aircraft 100 is in the air. Thus, the first and third dividers 206, 210 substantially increase the efficiency of the apparatus 202 and the aircraft 100 both on the ground and in the air.

Referring to FIG. 4, in some examples, the second divider 208 has a flange 402 that is coupled to the interior surface 306 between the first and third dividers 206, 210. In this example, to enable the door 204 to close and the second divider 208 to be received within the inlet aperture 205, the second divider 208 is off-set relative to the outwardly extending divider 216. However, in other examples, the second divider 208 can be received within the divider 216 or the divider 216 can be received within the second divider 208.

In some examples, to enable the first and second flow paths 212, 214 to operate more independently, an end and/or a portion 404 of the second divider 208 extends into the inlet aperture 205 past an edge 406 of the outwardly extending divider 216, thereby effectively separating the first flow path 212 from the second flow path 214. More specifically, in this example, the second divider 208 enables the first flow path 212 to operate at a lower mass flow rate without being negatively affected by the second flow path 214 operating at a higher mass flow rate or to enable the second flow path 214 to operate at a lower mass flow rate without being negatively affected by the first flow path 212 operating at a higher mass flow rate, for example. Enabling the first and second flow paths 212, 214 to operate at different mass flow rates without substantially interfering with one another enables a total pressure recovery to be increased and a flow distortion to be decreased for the lower mass flow rate flow path (e.g., 212, 214) and/or for a total pressure recovery and a flow distortion for the lower mass flow rate flow path (e.g., 212, 214) to not be substantially affected and/or reduced by the higher mass flow rate flow path (e.g., 212, 214). Additionally and/or alternatively, enabling the first and second flow paths 212, 214 to operate at different mass flow rates without interfering with one another enables a total pressure recovery to be increased and/or a flow distortion to be decreased in either and/or both of the lower mass flow rate flow path (e.g., 212, 214) and/or the higher mass flow rate flow path (e.g., 212, 214).

Depending on the status of the aircraft 100 (e.g., on the ground or in the air), the first flow path 212 or the second flow path 214 may have the higher mass flow rate.

Figure 5:
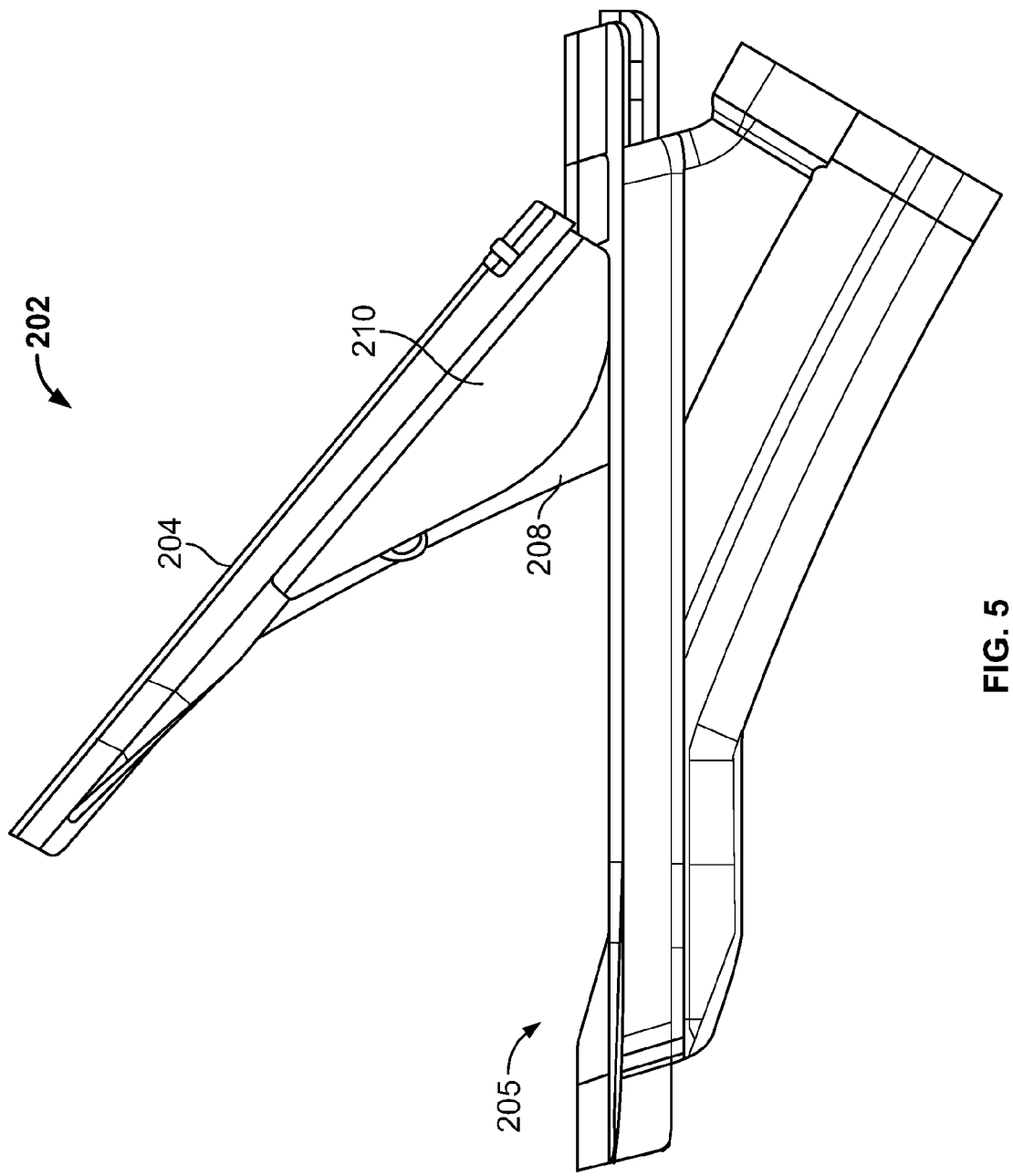
FIG. 5 depicts a side view of the example auxiliary power unit inlet apparatus as shown in FIG. 2 in accordance with the teachings of this disclosure.
Figure 6:
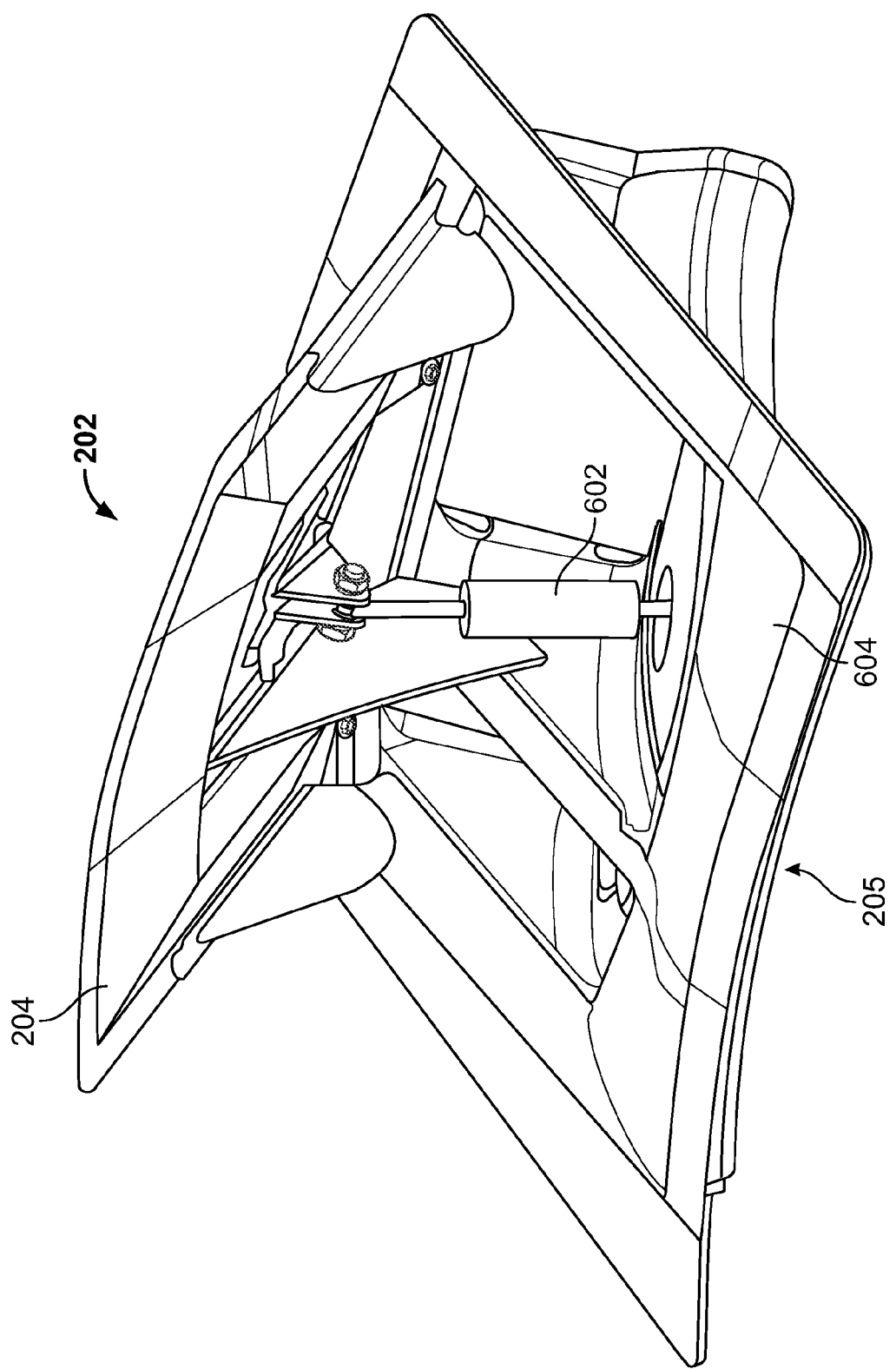
FIG. 6 depicts an isometric view of the example auxiliary power unit inlet apparatus as shown in FIG. 2 having an actuator to actuate an example door between an open position and a closed position.

FIG. 5 depicts a side view of the apparatus 202 and FIG. 6 depicts the apparatus 202 having an actuator 602 coupled between the door 204 and a surface 604 of the inlet aperture 205. The actuator 602 is configured to cause the door 204 to open or close based on commands received. While an actuator is shown in FIG. 6, in other examples, the actuator may not be provided.

From the foregoing, it will be appreciated that the above disclosed methods and apparatus substantially reduce air flow across an interior door surface between flow paths (e.g., an APU inlet duct, an APU cooling duct) of a dual flow APU inlet, thereby enabling the flow paths to operate independently. In some examples, the example door includes an integral isolation panel (e.g., the isolation panel is coupled to the door) that extends past an end of an internal divider. Thus, the isolation panel at least partially overlaps the internal divider to effectively divide air streams flowing into the respective air flow paths. In some examples, the isolation panel substantially separates air flowing to different customers (e.g., APU inlet, an eductor and/or an APU cooling duct) to increase the performance of the APU and/or the APU inlet. In some examples, the performance of the APU and/or the APU inlet is increased by substantially preventing an air flow path operating at a higher mass flow rate from negatively effecting an adjacent air flow path operating at a lower mass flow rate. For example, the isolation panel prevents the air flow path operating at the higher mass flow rate from reducing a total pressure recovery and/or increasing flow distortion for the air flow path operating at the lower mass flow rate.

As set forth herein, an example apparatus includes an air inlet for an aircraft including a first air flow path and a second air flow path. The first air flow path is immediately adjacent the second air flow path. The first air flow path is at least partially separated from the second air flow path by a first panel at least partially positioned within the air inlet. The example apparatus includes a door hingably coupled adjacent the air inlet. The door includes a second panel extending from an interior surface of the door to substantially prevent air from flowing across the interior surface between the first air flow path and the second air flow path.

In some examples, when the door is in an open position, a portion of the second panel is to extend into the air inlet past an edge of the first panel. In some examples, the first air flow path is an auxiliary power unit inlet and the second air flow path is an auxiliary power unit cooling duct inlet. In some examples, the apparatus also includes an actuator to actuate the door between an open position and a closed position. In some examples, the door also includes opposing side panels extending from the interior surface, the second panel being positioned between the side panels. In some examples, the second panel is offset relative the first panel to enable the second panel to be received within one of the first air flow path or the second air flow path when the door is in a closed position. In some examples, the second panel is to substantially prevent a total pressure recovery reduction for the second air flow path when the first air flow path is operating at a higher mass flow rate than the second air flow path.

An example method includes flowing air into a dual flow auxiliary power unit inlet and separating the air flow into a first air flow path and a second air flow path using a panel extending from an inlet door. In some examples, the panel substantially prevents air from flowing across an interior surface of the inlet door between the first air flow path and the second air flow path. In some examples, the panel substantially prevents a total pressure recovery reduction for the second air flow path when the first air flow path is operating at a higher mass flow rate than the second air flow path.

An example apparatus includes an air inlet for an aircraft having a first air flow path and a second air flow path. The first air flow path is at least partially separated from the second air flow path by a first panel at least partially positioned within the air inlet. The apparatus includes a door hingably coupled adjacent the air inlet and means for substantially preventing a total pressure recovery reduction of the second air flow path when the first air flow path is operating at a higher mass flow rate than the second air flow path. In some examples, the means for substantially preventing the total pressure recovery reduction includes a second panel extending from an interior surface of the door. In some examples, the second panel is offset relative the first panel to enable the second panel to be received within one of the first air flow path or the second air flow path when the door is in a closed position.

In some examples, the means for substantially preventing the total pressure recovery reduction is to substantially prevent air from flowing across an interior surface of the door between the first air flow path and the second air flow path. In some examples, the apparatus also includes an actuator to actuate the door between an open position and a closed position. In some examples, the door further also includes opposing side panels extending from an interior surface of the door. In some examples, the means for substantially preventing the total pressure recovery reduction is to be positioned between the side panels.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus, comprising:
an air inlet for an aircraft comprising a first air flow path and a second air flow path, the first air flow path being immediately adjacent the second air flow path, the first air flow path at least partially separated from the second air flow path by a first panel positioned within the air inlet; and
a door hingably coupled adjacent the air inlet, the door comprising a second panel oriented substantially parallel to the first panel and extending from an interior surface of the door to substantially prevent air from flowing across the interior surface between the first air flow path and the second air flow path, a portion of the second panel to extend into the air inlet past an edge of the first panel when the door is in a fully open position.

2. The apparatus of claim 1, wherein the first air flow path comprises an auxiliary power unit inlet and the second air flow path comprises an auxiliary power unit cooling duct inlet.

3. The apparatus of claim 1, further comprising an actuator to actuate the door between the fully open position and a closed position.

4. The apparatus of claim 1, wherein the door further comprises opposing side panels extending from the interior surface, the second panel being positioned between the side panels.

5. The apparatus of claim 4, wherein, when the door is in the fully open position, respective ones of the opposing side panels extend into the air inlet to at least partially cover corresponding ones of corners formed between opposing lateral edges of the door and a surface surrounding the air inlet.

6. The apparatus of claim 4, wherein the opposing side panels are substantially parallel to one another and to the second panel.

7. The apparatus of claim 4, wherein the second panel includes an edge extending away from the interior surface of the door, a portion of the edge of the second panel extending further into the air inlet than corresponding portions of corresponding edges of the opposing side panels.

8. The apparatus of claim 1, wherein the second panel is offset relative the first panel to enable the second panel to be received within one of the first air flow path or the second air flow path when the door is in a closed position.

9. The apparatus of claim 1, wherein the second panel is to substantially prevent a total pressure recovery reduction for the second air flow path when the first air flow path is operating at a higher mass flow rate than the second air flow path.

10. The apparatus of claim 1, wherein the first panel is adjacent the second panel when the door is in a closed position.

11. A method, comprising:
flowing air into an auxiliary power unit air inlet, the air inlet including a first air flow path and a second air flow path, the first air flow path being immediately adjacent the second air flow path, the first air flow path at least partially separated from the second air flow path by a first panel positioned within the air inlet; and
directing the air flow into the first air flow path and the second air flow path using a second panel oriented substantially parallel to the first panel and extending from an interior surface of an inlet door hingably coupled adjacent the air inlet, a portion of the second panel to extend into the air inlet past an edge of the first panel when the inlet door is in a fully open position.

12. The method of claim 11, wherein the second panel substantially prevents air from flowing across the interior surface of the inlet door between the first air flow path and the second air flow path.

13. The method of claim 11, wherein the second panel substantially prevents a total pressure recovery reduction for the second air flow path when the first air flow path is operating at a higher mass flow rate than the second air flow path.

14. An apparatus, comprising:
an air inlet for an aircraft comprising a first air flow path and a second air flow path, the first air flow path at least partially separated from the second air flow path by a first panel positioned within the air inlet; and
a door hingably coupled adjacent the air inlet, the door comprising means for substantially preventing a total pressure recovery reduction for the second air flow path when the first air flow path is operating at a higher mass flow rate than the second air flow path, the means for substantially preventing the total pressure recovery reduction to extend into the air inlet past an edge of the first panel when the door is in a fully open position.

15. The apparatus of claim 14, wherein the means for substantially preventing the total pressure recovery reduction comprises a second panel extending from an interior surface of the door.

16. The apparatus of claim 15, wherein the second panel is offset relative to the first panel to enable the second panel to be received within one of the first air flow path or the second air flow path when the door is in a closed position.

17. The apparatus of claim 14, wherein the means for substantially preventing the total pressure recovery reduction is to substantially prevent air from flowing across an interior surface of the door between the first air flow path and the second air flow path.

18. The apparatus of claim 14, further comprising an actuator to actuate the door between the fully open position and a closed position.

19. The apparatus of claim 14, wherein the door further comprises opposing side panels extending from an interior surface of the door.

20. The apparatus of claim 19, wherein the means for substantially preventing the total pressure recovery reduction is positioned between the side panels.

21. An apparatus, comprising:
a door selectively covering a first flow path and a second flow path, the door including:
a first panel extending from a first side of the door, when the door is in a fully open position, the first panel to cover a first corner formed between the door and a first surface defining the first flow path;
a second panel extending from a second side of the door, when the door is in the fully open position, the second panel to cover a second corner formed between the door and a second surface defining the second flow path; and a third panel to extend toward at least one of the first flow path or the second flow path, when the door is in the fully open position, the third panel to extend into the at least one of the first flow path or the second flow path.

22. The apparatus of claim 21, wherein the first panel, the second panel, and the third panel are substantially parallel to one another and are to be substantially parallel to corresponding surfaces defining at least one of the first flow path or the second flow path.

* * * * *

UNITED STATES PATENT AND TRADEMARK OFFICE
CERTIFICATE OF CORRECTION

PATENT NO. : 9,611,050 B2
APPLICATION NO. : 13/952219
DATED : April 4, 2017
INVENTOR(S) : Paul R. Tretow, David S. Chambers and Robert H. Willie Page 1 of 1

It is certified that error appears in the above-identified patent and that said Letters Patent is hereby corrected as shown below:

In the Claims

Column 5, Line 47 (Claim 7): Add the words "a portion of" between the words "wherein" and "the"

Signed and Sealed this
Twenty-third Day of May, 2017

Michelle K. Lee
*Director of the United States Patent and Trademark Office*